(12) United States Patent
Shah et al.

(10) Patent No.: US 11,720,267 B2
(45) Date of Patent: Aug. 8, 2023

(54) MAINTAINING A FAULT-TOLERANCE THRESHOLD OF A CLUSTERSTORE DURING MAINTENANCE ACTIVITIES

(71) Applicant: VMware, Inc., Palo Alto, CA (US)

(72) Inventors: Alkesh Shah, Sunnyvale, CA (US); Austin Kramer, Redwood City, CA (US); Leonid Livshin, Malden, MA (US); Ramses V. Morales, Sunnyvale, CA (US); Brian Masao Oki, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/504,829

(22) Filed: Oct. 19, 2021

(65) Prior Publication Data

US 2023/0118169 A1 Apr. 20, 2023

(51) Int. Cl.
*G06F 3/06* (2006.01)

(52) U.S. Cl.
CPC .......... *G06F 3/0634* (2013.01); *G06F 3/0604* (2013.01); *G06F 3/067* (2013.01); *G06F 3/0619* (2013.01); *G06F 3/0631* (2013.01)

(58) Field of Classification Search
CPC .... G06F 3/0634; G06F 3/0604; G06F 3/0619; G06F 3/067; G06F 3/0631
See application file for complete search history.

(56) References Cited

U.S. PATENT DOCUMENTS

| | | | | |
|---|---|---|---|---|
| 2014/0376362 A1* | 12/2014 | Selvaraj | ................ | H04L 41/082 370/221 |
| 2018/0165166 A1* | 6/2018 | Wang | ................... | G06F 11/2033 |
| 2020/0117494 A1* | 4/2020 | Cortez | ................... | G06F 9/4856 |
| 2021/0279111 A1* | 9/2021 | Ranjan | .................... | G06F 9/455 |
| 2021/0389991 A1* | 12/2021 | Chu | .......................... | G06F 8/65 |
| 2022/0094751 A1* | 3/2022 | Szczesniak | ......... | H04L 67/1036 |
| 2022/0300387 A1* | 9/2022 | Rayaraddi | ........... | G06F 11/1464 |

* cited by examiner

*Primary Examiner* — Mark A Giardino, Jr.
(74) *Attorney, Agent, or Firm* — Patterson + Sheridan, LLP (57) ABSTRACT

A method for maintaining fault tolerance in a storage cluster is provided. Embodiments include receiving, by a management component associated with a distributed data store on a cluster of host machines, a request to place a first host machine of the cluster of host machines in a maintenance mode, wherein the first host machine stores given data of the distributed data store. Embodiments include determining whether a second host machine that does not currently store any data of the distributed data store exists in the cluster of host machines. Embodiments include determining, based on whether the second host machine exists in the cluster of host machines, whether to transfer the given data of the distributed data store from the first host machine to the second host machine. Embodiments include initiating the maintenance mode on the first host machine.

20 Claims, 8 Drawing Sheets

MAINTAINING A FAULT-TOLERANCE THRESHOLD OF A CLUSTERSTORE DURING MAINTENANCE ACTIVITIES

BACKGROUND

A plurality of physical computing devices, referred to as hosts, may be in communication over a physical network infrastructure, each host running one or more virtualized endpoints such as virtual machines (VMs), containers, or other virtual computing instances (VCIs). In a software defined network (SDN), the VCIs may be connected to logical overlay networks that may span multiple hosts and are decoupled from the underlying physical network infrastructure. Though certain aspects are discussed herein with respect to VMs, it should be noted that they may similarly be applicable to other suitable VCIs. The hosts may be managed by one or more management devices, such as a virtualization manager.

In some cases, hosts are organized into a cluster that operates as a pool of shared resources, and the virtualization manager may maintain a clusterstore, which is generally a distributed data store that includes state information about of a cluster of hosts. The data store may be distributed across multiple hosts of a cluster. State information stored in a clusterstore may include, for example, a list of all hosts that belong to the cluster, multi-VM resource allocation (e.g., minimum and maximum CPU and memory that can be allocated to a group of VMs), VM restart orchestration (e.g., specifying a sequence in which VMs are to be restarted if a host fails and VMs are restarted elsewhere in the cluster), and/or the like.

A clusterstore may be implemented in a fault-tolerant manner in order to ensure availability of cluster state information in the event of one or more host failures. For example, the clusterstore may be distributed as a plurality of components (e.g., including subsets of the clusterstore) across a plurality of hosts in the cluster, including a certain number of replicas of each component of the clusterstore, such that a certain number of host failures may be tolerated in the cluster while still maintaining availability of the entirety of the clusterstore. For example, a fault tolerance policy for the clusterstore may indicate a number of failures to tolerate (FTT), meaning that the clusterstore must be implemented in such a way as to guarantee data access even in the event that a certain number of hosts fail.

In some cases, a host may need to undergo certain maintenance operations, such as operating system (OS) upgrades and/or other hardware and/or software changes, and the host may be unavailable for a significant amount of time while such maintenance is being performed. For example, a host may be placed into a maintenance mode in order to perform maintenance operations, and the host may be offline or otherwise unavailable while in maintenance mode. If a host in a cluster is placed in maintenance mode, the availability of data objects such as a clusterstore stored on the cluster may be affected, as the maintenance mode will be equivalent to a host failure in the cluster. Furthermore, the FTT of a clusterstore stored on a cluster may not be able to be maintained, particularly if multiple hosts in the cluster are placed in maintenance mode.

Accordingly, there is a need in the art for improved techniques of maintaining fault tolerance of clusterstores in clusters of hosts when one or more hosts are placed in maintenance mode.

DETAILED DESCRIPTION

A distributed data store, such as a clusterstore that stores state information of a cluster of hosts, may be stored in a fault tolerant manner (e.g., including replication) across a plurality of hosts in the cluster (e.g., less than all hosts in the cluster). When a host in the cluster must undergo maintenance, it is placed in maintenance mode, during which time data stored on the host is unavailable. In order to maintain fault tolerance of the distributed data store, embodiments of the present disclosure involve determining whether, before the host is placed in maintenance mode, object data (e.g., clusterstore data) stored on the host can be transferred to another available host in the cluster.

Maintenance mode is generally used to perform firmware updates, security patches, hardware refresh/replacement, and other types of software and/or hardware maintenance operations on a host. If the host is running a node of a clusterstore (e.g., a component, which may be a replica), placing the host in maintenance mode can affect the availability of such a clusterstore, as this will manifest as a failure to the clusterstore. Since the clusterstore is used to store state information for the cluster, it is important for it to have a high level of availability.

In a particular example, a clusterstore is distributed across multiple hosts in a cluster in a fault tolerant manner such that replicas of components of the clusterstore are stored on multiple hosts. Before a given host storing a given replica is to be placed in maintenance mode, a pre-maintenance request for the given host is submitted by an administrator to a management component such as a virtualization manager or another suitable controller or manager. The management component then determines whether there is an available host in the cluster that does not presently store a replica for the storage object. If such an available host exists, the management component transfers the given replica from the given host to the available host. The management component then places the given host in maintenance mode and the cluster continues to maintain the same number of FTT.

However, if the management component determines that there are no available hosts to which the given replica can be transferred, it may take one or more different actions. In some embodiments, when an FTT of the clusterstore is greater than one, the management component decrements the FTT of the clusterstore by one if there are no available hosts to which the given replica can be transferred. This is because when the given host is placed in maintenance mode it is likely to be unavailable for an extensive amount of time and, if the given replica cannot be transferred to another host, the cluster will be tolerant of one less failure. If the FTT of the clusterstore is less than or equal to one and there is no available host to which the given replica can be transferred, then the fault-tolerant implementation of the clusterstore may be deactivated, changing the clusterstore to a non-fault-tolerant implementation (e.g., a single node). Finally, if there is only one host in the cluster, then the clusterstore may need to be unavailable while the host is in maintenance mode.

By transferring clusterstore data from a host that is to be placed in maintenance mode to another host in a cluster when such a host is available, techniques described herein improve upon conventional fault tolerance techniques by allowing a fault tolerance level of a clusterstore to be maintained while maintenance operations are performed. As such, embodiments of the present disclosure improve upon conventional fault tolerance techniques, such as those in which a host entering maintenance mode is treated as a host failure, by allowing a clusterstore to continue to tolerate a set number of failures even when a host is unavailable due to maintenance. Maintaining fault tolerance during maintenance operations in a cluster as described herein provides system stability, improved data availability, and continued functioning of a distributed data store under conditions that would conventionally result in reduced fault tolerance or even complete unavailability of the distributed data store.

It is noted that while certain embodiments are described herein with respect to virtualized computing environments and clusterstores, techniques described herein may also be employed to maintain fault tolerance of other types of distributed storage objects, such as other distributed data stores or objects, whether in virtualized computing environments or physical computing environments. For example, a non-virtualized computing environment may include a distributed data store on a cluster of computing devices, such as storing state information related to the computing devices in the cluster, and this distributed data store may be managed by a management component of the non-virtualized computing environment in order to employ techniques as described herein for maintaining fault tolerance.

Figure 1:
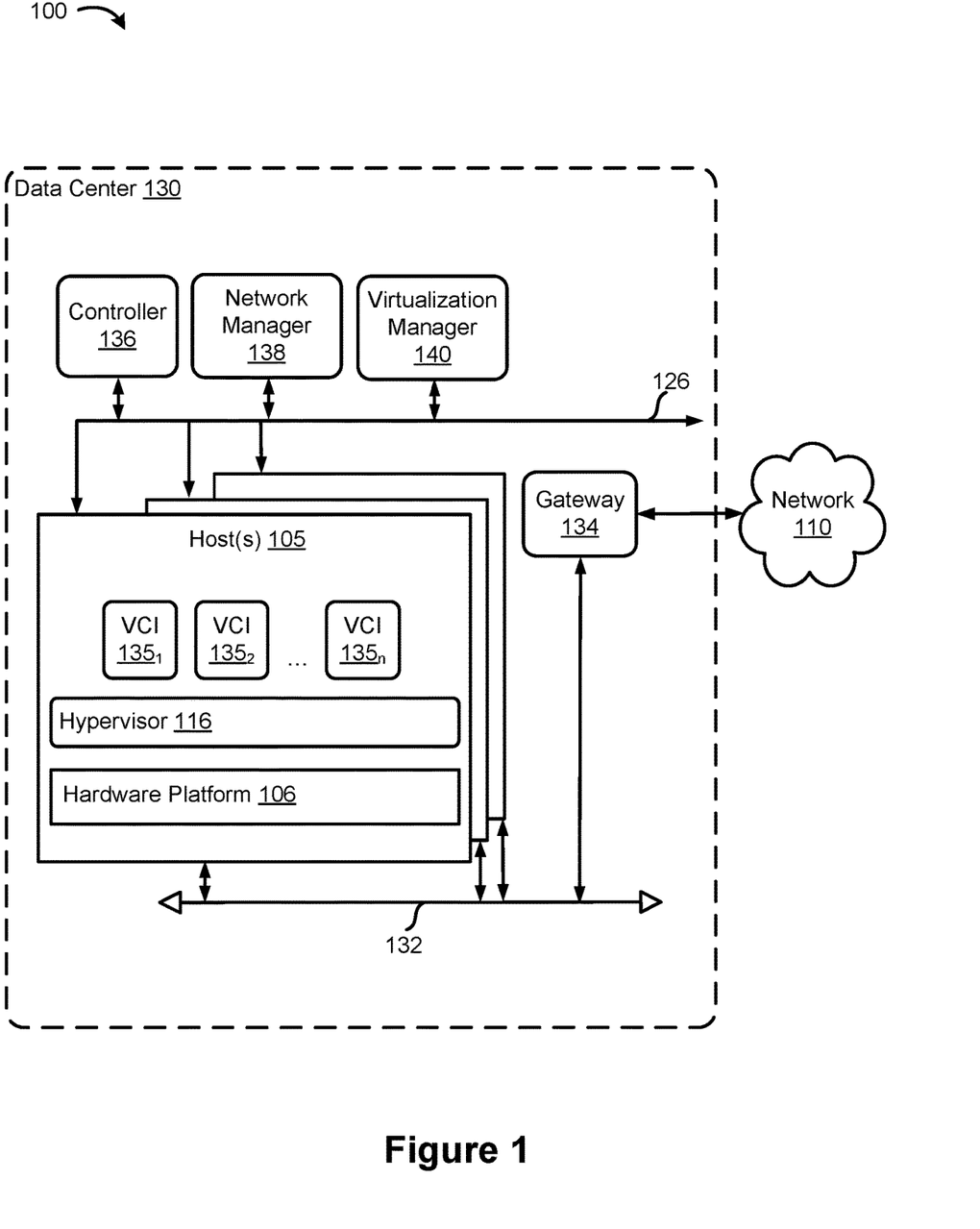
FIG. 1 is a diagram depicting example physical and virtual network components with which embodiments of the present disclosure may be implemented.

FIG. 1 is a diagram depicting example physical and virtual network components with which embodiments of the present disclosure may be implemented. Networking environment 100 includes data center 130 connected to network 110. Network 110 is generally representative of a network of computing entities such as a local area network ("LAN") or a wide area network ("WAN"), a network of networks, such as the Internet, or any connection over which data may be transmitted.

Data center 130 generally represents a set of networked computing entities, and may comprise a logical overlay network. Data center 130 includes host(s) 105, a gateway 134, a data network 132, which may be a Layer 3 network, and a management network 126. Data network 132 and management network 126 may be separate physical networks or different virtual local area networks (VLANs) on the same physical network.

Each of hosts 105 may be constructed on a server grade hardware platform 106, such as an x86 architecture platform. For example, hosts 105 may be geographically co-located servers on the same rack or on different racks. Host 105 is configured to provide a virtualization layer, also referred to as a hypervisor 116, that abstracts processor, memory, storage, and networking resources of hardware platform 106 into multiple virtual computing instances (VCIs) $135_1$ to $135n$ (collectively referred to as VCIs 135 and individually referred to as VCI 135) that run concurrently on the same host. VCIs 135 may include, for instance, VMs, containers, virtual appliances, and/or the like.

Hypervisor 116 may run in conjunction with an operating system (not shown) in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. In certain aspects, hypervisor 116 implements one or more logical entities, such as logical switches, routers, etc. as one or more virtual entities such as virtual switches, routers, etc. In some implementations, hypervisor 116 may comprise system level software as well as a "Domain 0" or "Root Partition" virtual machine (not shown) which is a privileged machine that has access to the physical hardware resources of the host. In this implementation, one or more of a virtual switch, virtual router, virtual tunnel endpoint (VTEP), etc., along with hardware drivers, may reside in the privileged virtual machine. Although aspects of the disclosure are described with reference to VMs, the teachings herein also apply to other types of virtual computing instances (VCIs) or data compute nodes (DCNs), such as containers, which may be referred to as Docker containers, isolated user space instances, namespace containers, etc., or even to physical computing devices. In certain embodiments, VCIs 135 may be replaced with containers that run on host 105 without the use of a hypervisor.

Gateway 134 provides VCIs 135 and other components in data center 130 with connectivity to network 110, and is used to communicate with destinations external to data center 130 (not shown). Gateway 134 may be a virtual computing instance, a physical device, or a software module running within host 105.

Controller 136 generally represents a control plane that manages configuration of VCIs 135 within data center 130. Controller 136 may be a computer program that resides and executes in a central server in data center 130 or, alternatively, controller 136 may run as a virtual appliance (e.g., a VM) in one of hosts 105. Although shown as a single unit, it should be understood that controller 136 may be implemented as a distributed or clustered system. That is, controller 136 may include multiple servers or virtual computing instances that implement controller functions. Implementing a control plane as a cluster, as well as various sharding techniques for distributing data by a clustered control plane, is described in more detail in U.S. Pat. No. 10,447,535, the contents of which are incorporated herein by reference in their entirety. Controller 136 is associated with one or more virtual and/or physical CPUs (not shown). Processor(s) resources allotted or assigned to controller 136 may be unique to controller 136, or may be shared with other components of data center 130. Controller 136 communicates with hosts 105 via management network 126.

Network manager 138 and virtualization manager 140 generally represent components of a management plane comprising one or more computing devices responsible for receiving logical network configuration inputs, such as from a network administrator, defining one or more endpoints (e.g., VCIs and/or containers) and the connections between the endpoints, as well as rules governing communications between various endpoints. In one embodiment, network manager 138 is a computer program that executes in a central server in networking environment 100, or alternatively, network manager 138 may run in a VM, e.g. in one of hosts 105. Although shown as a single unit, it should be understood that network manager 138 may be implemented as a distributed or clustered system. That is, network manager 138 may include multiple servers or VCIs that implement management functions. Network manager 138 is configured to receive inputs from an administrator or other entity, e.g., via a web interface or API, and carry out administrative tasks for data center 130, including centralized network management and providing an aggregated system view for a user.

In an embodiment, virtualization manager 140 is a computer program that executes in a central server in data center 130 (e.g., the same or a different server than the server on which network manager 138 executes), or alternatively, virtualization manager 140 runs in one of VCIs 135. Virtualization manager 140 is configured to carry out administrative tasks for data center 130, including managing hosts 105, managing VCIs 135 running within each host 105, provisioning VCIs 135, transferring VCIs 135 from one host to another host, transferring VCIs 135 between data centers, transferring application instances between VCIs 135 or between hosts 105, and load balancing among hosts 105 within data center 130. Virtualization manager 140 takes commands from components located on control network 126 as to creation, migration, and deletion decisions of VCIs 135 and application instances on data center 130. However, virtualization manager 140 also makes independent decisions on management of local VCIs 135 and application instances, such as placement of VCIs 135 and application instances between hosts 105. In some embodiments, virtualization manager 140 also includes a migration component that performs migration of VCIs between hosts 105, such as by live migration. According to certain embodiments, virtualization manger 140 allows an administrator to provide input initiating the placement of hosts in maintenance mode. For example, the administrator may interact with virtualization manager 140 to request placing a host 105 in maintenance mode.

In certain embodiments, as described in more detail below with respect to FIGS. 3-8, virtualization manager 140 may maintain a clusterstore that includes state information for a cluster of hosts 105. In an example, virtualization manager 140 receives a request (e.g., from an administrator) to place a host 105 in maintenance mode, and may determine whether there is another available host 105 in the cluster to which clusterstore data stored on the host 105 may be transferred.

Figure 2:
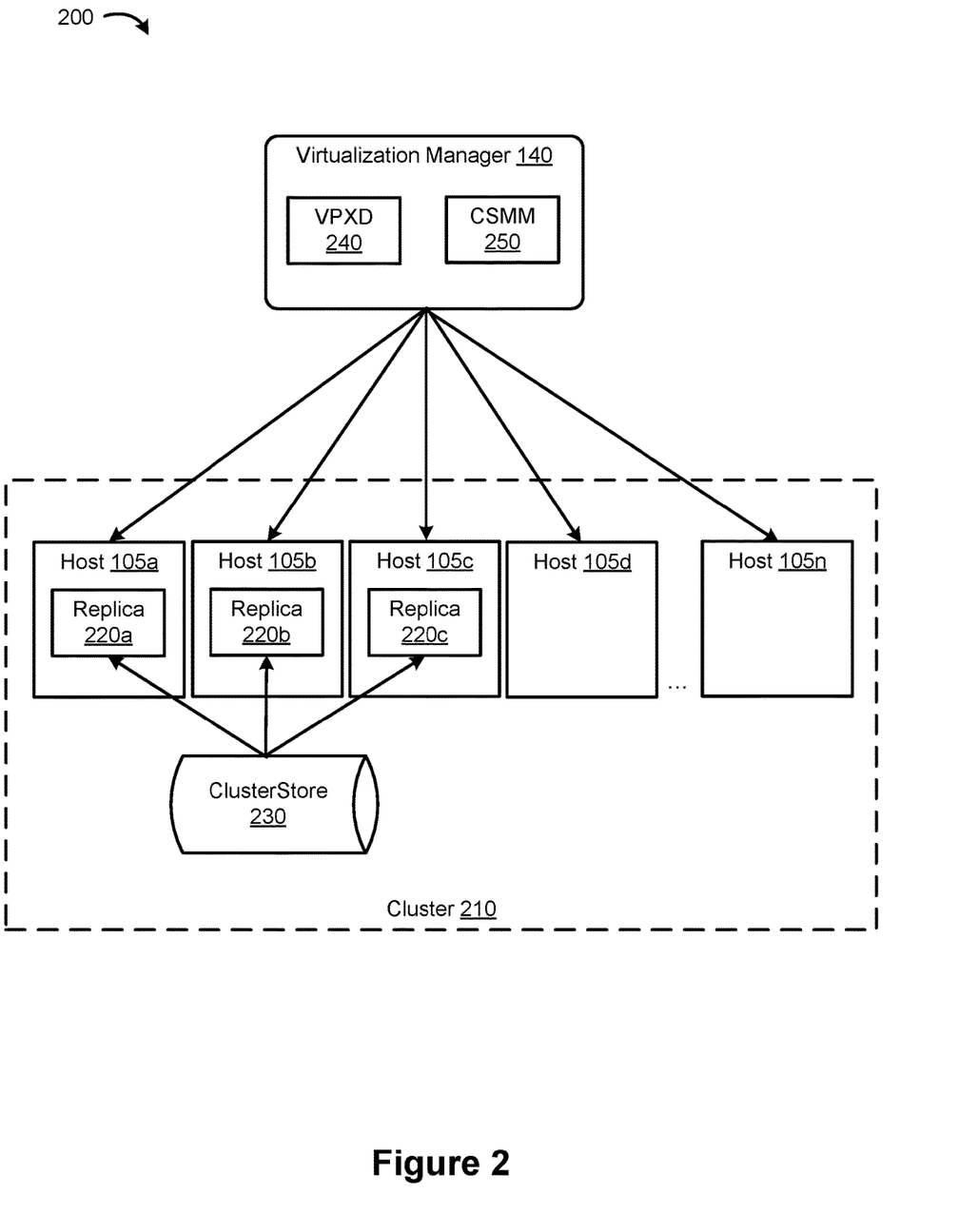
FIG. 2 is a diagram illustrating an example of a clusterstore according to embodiments of the present disclosure.

FIG. 2 is a diagram 200 illustrating an example of a clusterstore according to embodiments of the present disclosure. Diagram 200 includes virtualization manager 140 of FIG. 1. Furthermore, hosts 105a-n of cluster 210 may correspond to hosts 105 of FIG. 1.

Virtualization manager 140 comprises a Virtual Provisioning X Daemon (VPXD) 240, which represents an agent within virtualization manager 140 that performs management and provisioning functions for hosts associated with virtualization manager 140. Virtualization manager 140 further comprises Clusterstore Membership Manager (CSMM), which maintains information about members of cluster 210 and manages placement of data (e.g., replicas 220) on hosts in cluster 210 in order to implement a clusterstore 230, such as in a distributed, fault-tolerant manner.

For example, CSMM 250 may place replicas 220a, 220b, and 220c of clusterstore 230 on hosts 105a, 105b, and 105c, respectively. In an example clusterstore 230 has an FTT of 1, and so CSMM 250 ensures that the entirety of clusterstore 230 can be reconstructed from any two of hosts 105a, 105b, and 105c in the event that one of these hosts fails.

VPXD 240 may handle requests to provision and shut down hosts 105, including requests to place hosts in maintenance mode (e.g., from the management plane). When VPXD 240 receives a request to place a given host 105a in maintenance mode, if the host 105 stores a replica 220, VPXD 240 communicates with CSMM 250 to initiate a replica transfer profess. Based on the request, CSMM 250 determines whether there is another available host 105 to which it can transfer the replica 220 from the host 105 that is to be placed in maintenance mode, as described in more detail below with respect to Figures. 3-8.

Figure 3:
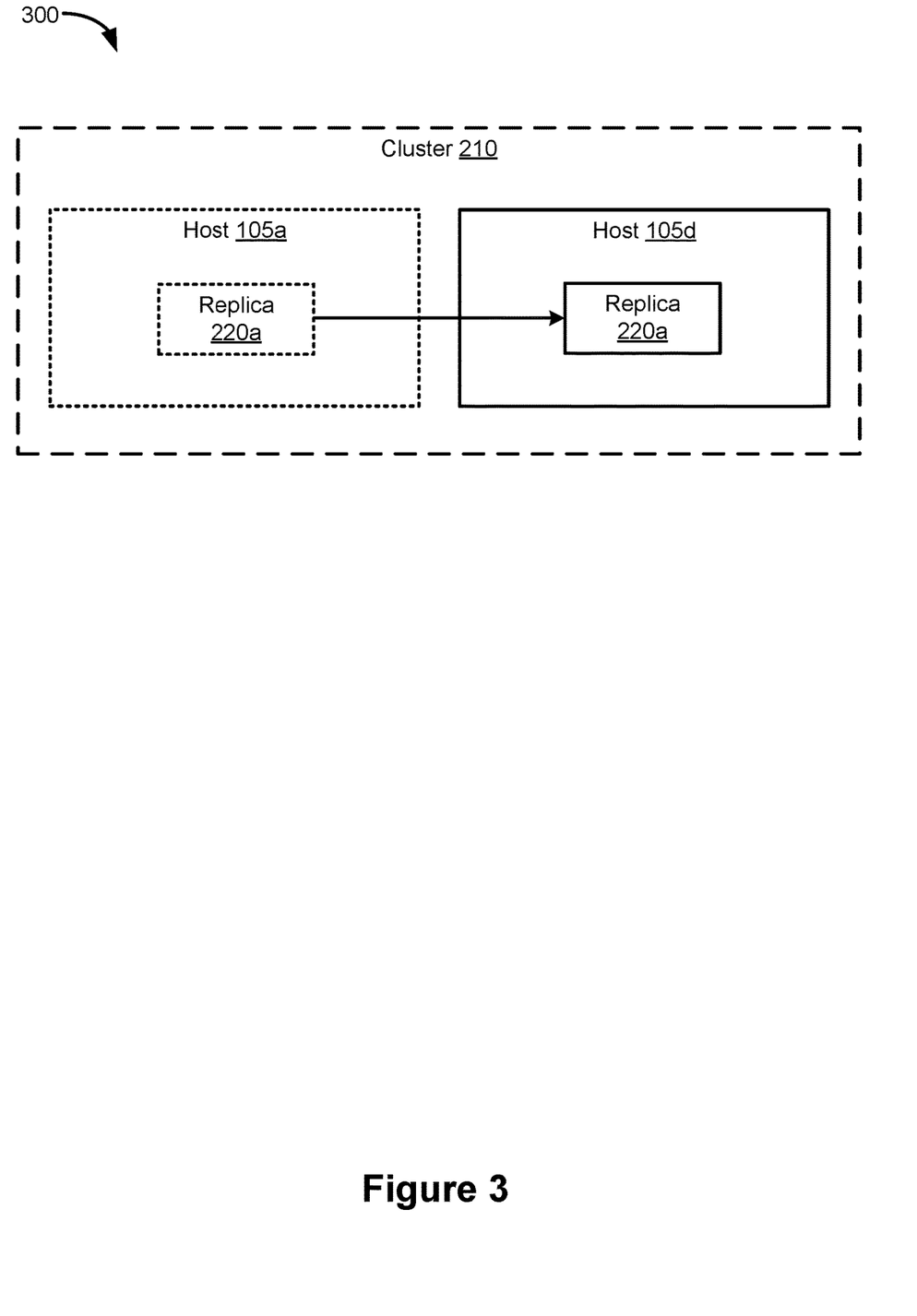
FIG. 3 is an illustration of transferring data from a host that is to be placed in maintenance mode to a different host.

FIG. 3 is an illustration 300 of transferring data from a host that is to be placed in maintenance mode to a different host. Illustration 300 includes cluster 210, hosts 105a and 105d, and replica 220a of FIG. 2.

In an example, an administrator has requested to place host 105a in maintenance mode, such as to perform software or hardware maintenance operations. Upon receiving the request to place host 105a in maintenance mode, a management component (e.g., virtualization manager 140 of FIG. 1) determines whether there is an available host in cluster 210 to which replica 220a can be transferred.

The management component determines that host 105d is available. For example, host 105d may be another host in cluster 210 that has available space and does not currently store any components of the clusterstore. As such, the management component transfers replica 220a from host 105a to host 105d prior to placing host 105a in maintenance mode. In some embodiments, in order to transfer replica 220a from host 105a to host 105d, the management component recreates replica 220a on host 105d (e.g., based on the management component's stored information about the cluster and its state) and removes replica 220a from host 105a. Recreating the replica rather than copying it from the host to be placed in maintenance mode may be advantageous, for example, in cases where there are only two active hosts in the clusterstore (e.g., two hosts that store replicas of the clusterstore) because of the possibility of a "split brain" scenario in which both active hosts have become partitioned from one another and each active host is unable to determine if it has a current version of a replica. Thus, in such cases, the management component may recreate the replica from scratch on the new host (e.g., host 105d) and then remove the replica from the host to be placed in maintenance mode (e.g., host 105a).

After transferring replica 220a from host 105a to host 105d, the management component may place host 105a in maintenance mode.

Figure 4:
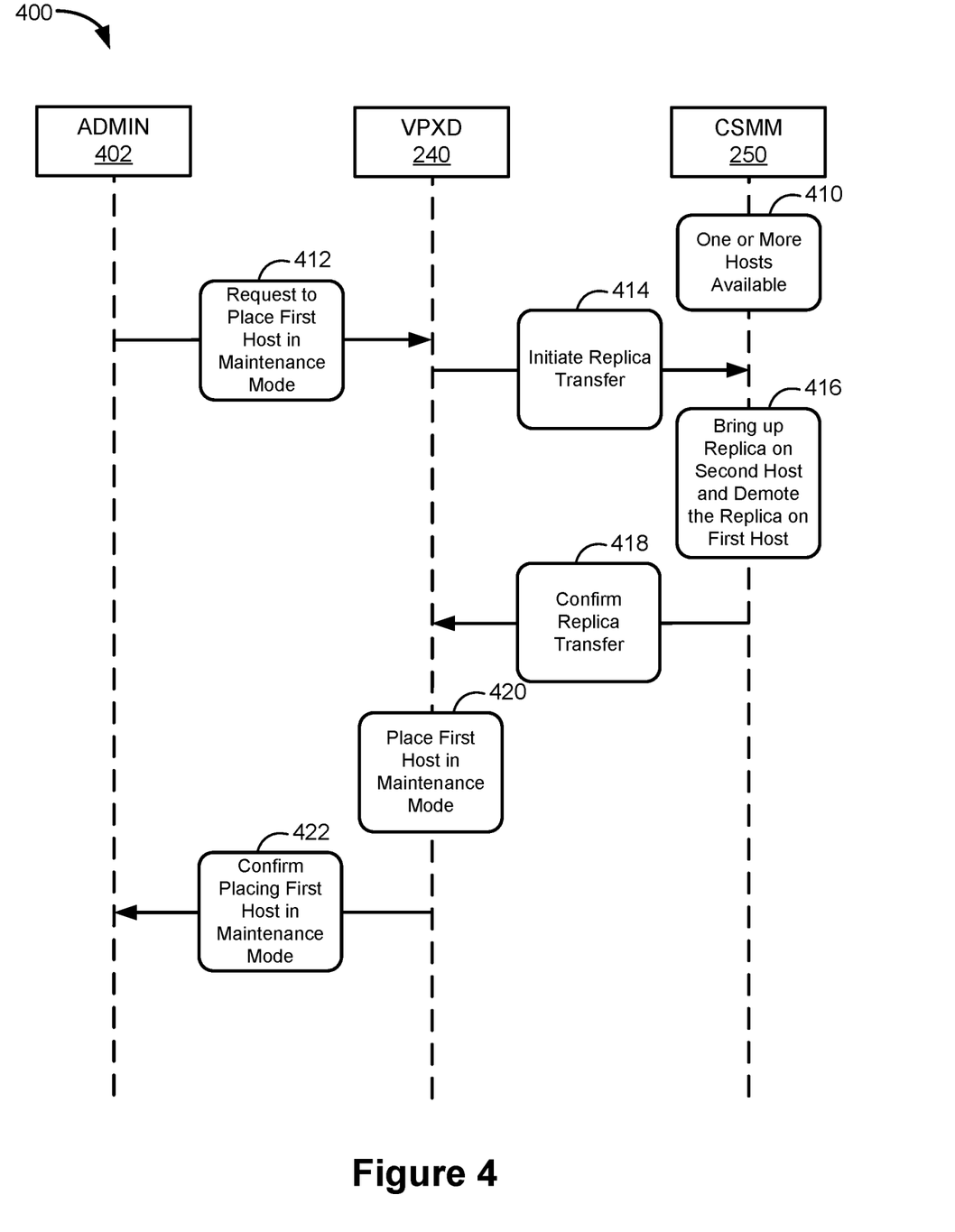
FIG. 4 is a diagram illustrating an example data flow between components related to maintaining fault tolerance in a storage cluster.

FIG. 4 is a diagram 400 illustrating an example data flow between components related to maintaining fault tolerance in a storage cluster such as a clusterstore. In particular, diagram 400 relates to an example where one or more hosts in the cluster are available to accept a replica transfer from a host that is to be placed in maintenance mode.

Diagram 400 includes VPXD 240 and CSMM 250 of FIG. 2. Administrator 402 represents an administrator, who may provide input to and receive output from a management component such as virtualization manager 140 of FIG. 1.

As indicated at 410, CSMM 250 maintains information indicating that one or more hosts are available in the cluster for accepting a replica transfer.

At 412, administrator 402 provides a request to VPXD 240 to place a first host in maintenance mode (e.g., by providing input via a user interface or calling a method provided by an application programming interface (API)).

At 414, VPXD 240 sends a message to CSMM 250 initiating a replica transfer from the first host to any other available host.

At 416, because one or more hosts are available, including a second host, CSMM 250 brings up the replica currently stored on the first host on the second host, and demotes the replica on the first host (e.g., removes the replica from the first host).

At 418, CSMM 250 sends a message to VPXD 240 confirming that the replica was transferred from the first host.

At 420, VPXD 240 places the first host in maintenance mode.

At 422, VPXD 240 confirms to administrator 402 that the first host was placed in maintenance mode, such as by providing output via a user interface or responding to an API call.

Figure 5:
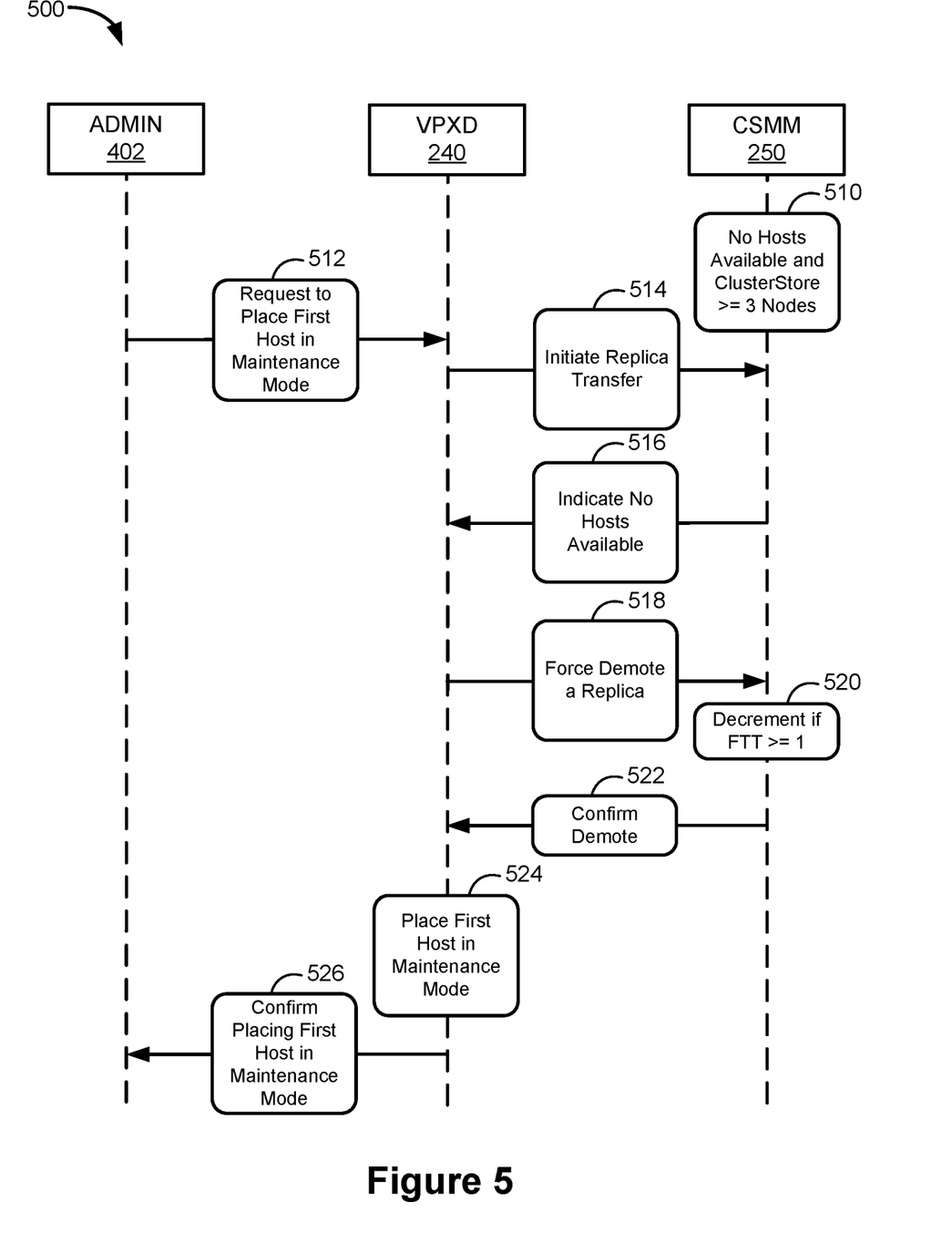
FIG. 5 is a diagram illustrating another example data flow between components related to maintaining fault tolerance in a storage cluster.

FIG. 5 is a diagram 500 illustrating another example data flow between components related to maintaining fault tolerance in a storage cluster. In particular, diagram 500 relates to an example where no hosts in the cluster are available to accept a replica transfer from a host that is to be placed in maintenance mode and the clusterstore includes components stored on three or more hosts.

Diagram 500 includes administrator 402, VPXD 240, and CSMM 250 of FIG. 4.

As indicated at 510, CSMM 250 maintains information indicating that no hosts are available in the cluster for accepting a replica transfer, and that the clusterstore contains three or more nodes (e.g., meaning that the clusterstore is stored as three or more components such as replicas on three or more different hosts).

At 512, administrator 402 provides a request to VPXD 240 to place a first host in maintenance mode (e.g., by providing input via a user interface or calling a method provided by an API).

At 514, VPXD 240 sends a message to CSMM 250 initiating a replica transfer from the first host to any other available host.

At 516, because no hosts are available, CSMM 250 notifies VPXD 240 that there are no hosts available to receive a replica transfer.

At 518, VPXD 240 sends a message to CSMM 250 to force demote a replica (e.g., to remove the replica from the first host).

At 520, CSMM 250 decrements the FTT of the clusterstore by one if the FTT is greater than or equal one. If the FTT is zero, it cannot be decremented further. By decrementing the FTT, CSMM 250 is updating the fault tolerance of the clusterstore to be more indicative of the actual implementation of the clsuterstore on the cluster in view of the fact that a replica will need to be removed without transferring it to another host. CSMM 250 also demotes the replica on the first host (e.g., removes the replica from the first host).

At 522, CSMM 250 sends a message to VPXD 240 confirming that the replica was demoted.

At 524, VPXD 240 places the first host in maintenance mode.

At 526, VPXD 240 confirms to administrator 402 that the first host was placed in maintenance mode, such as by providing output via a user interface or responding to an API call.

Figure 6:
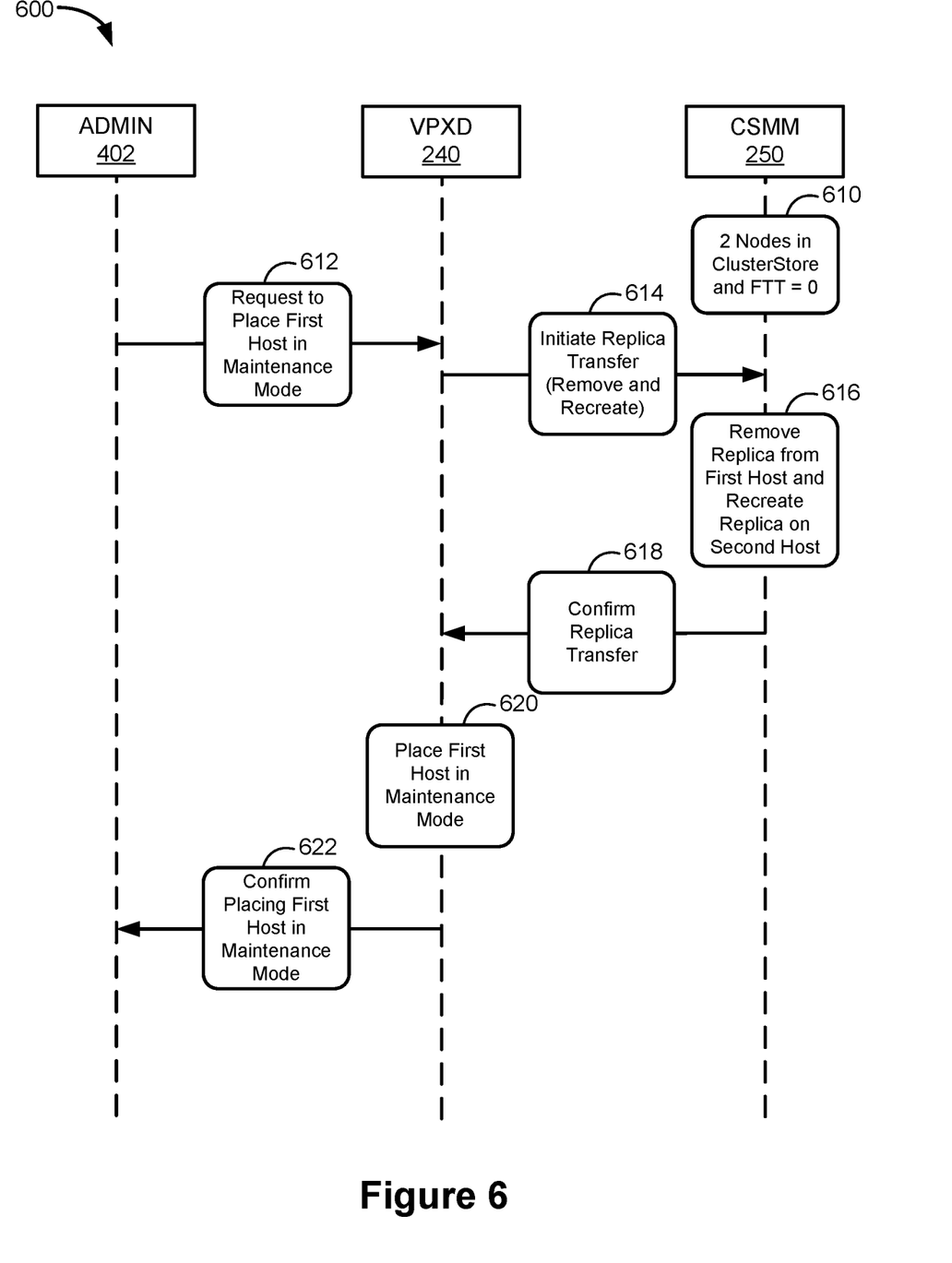
FIG. 6 is a diagram illustrating another example data flow between components related to maintaining fault tolerance in a storage cluster.

FIG. 6 is a diagram 600 illustrating another example data flow between components related to maintaining fault tolerance in a storage cluster. In particular, diagram 600 relates to an example where the clusterstore has two nodes and an FTT of zero and a host is available to receive a replica transfer.

Diagram 600 includes administrator 402, VPXD 240, and CSMM 250 of FIGS. 4 and 5.

As indicated at 610, CSMM 250 maintains information indicating that there are two nodes in the clusterstore and that the clusterstore has an FTT of zero.

At 612, administrator 402 provides a request to VPXD 240 to place a first host in maintenance mode (e.g., by providing input via a user interface or calling a method provided by an API).

At 614, VPXD 240 sends a message to CSMM 250 initiating a replica transfer from the first host to any other available host. In this case, the replica transfer is to be a removal and recreation of the replica because there are only two nodes in the clusterstore and each host may potentially be unable to determine whether it has an updated version of its given replica.

At 616, because one or more hosts are available, including a second host, CSMM 250 removes the replica from the first host and recreates the replica on the second host.

At 618, CSMM 250 sends a message to VPXD 240 confirming that the replica transfer was completed as requested.

At 620, VPXD 240 places the first host in maintenance mode.

At 622, VPXD 240 confirms to administrator 402 that the first host was placed in maintenance mode, such as by providing output via a user interface or responding to an API call.

Figure 7:
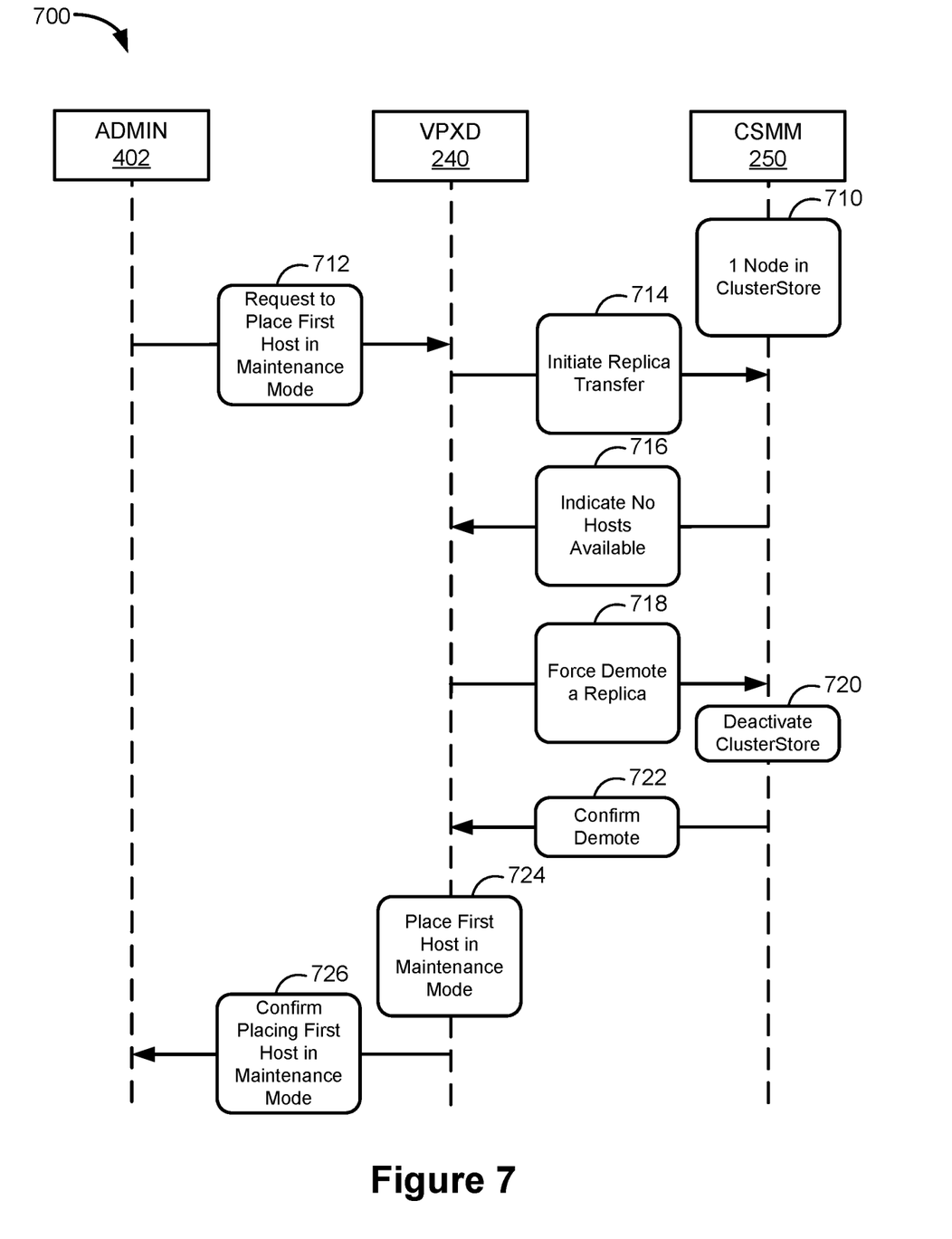
FIG. 7 is a diagram illustrating another example data flow between components related to maintaining fault tolerance in a storage cluster.

FIG. 7 is a diagram 700 illustrating another example data flow between components related to maintaining fault tolerance in a storage cluster. In particular, diagram 700 relates to an example where no hosts in the cluster are available to accept a replica transfer from a host that is to be placed in maintenance mode and the clusterstore includes one node.

Diagram 700 includes administrator 402, VPXD 240, and CSMM 250 of FIGS. 4-6.

As indicated at 710, CSMM 250 maintains information indicating that the clusterstore contains only one node.

At 712, administrator 402 provides a request to VPXD 240 to place a first host in maintenance mode (e.g., by providing input via a user interface or calling a method provided by an API).

At 714, VPXD 240 sends a message to CSMM 250 initiating a replica transfer from the first host to any other available host.

At 716, because no hosts are available, CSMM 250 notifies VPXD 240 that there are no hosts available to receive a replica transfer.

At 718, VPXD 240 sends a message to CSMM 250 to force demote a replica (e.g., to remove the replica from the first host).

At 720, CSMM 250 deactivates the clusterstore and removes the replica from the first host. This is because, even though there are no available hosts to which the replica may be transferred, the maintenance operations on the first host must still be performed. As such, in this case, the clusterstore must be unavailable until the either the maintenance operations are completed or another host becomes available on which the clusterstore may be recreated.

At 722, CSMM 250 sends a message to VPXD 240 confirming that the replica was demoted.

At 724, VPXD 240 places the first host in maintenance mode.

At 726, VPXD 240 confirms to administrator 402 that the first host was placed in maintenance mode, such as by providing output via a user interface or responding to an API call.

An FTT of a clusterstore (or other distributed data store or storage object) generally indicates the number of host failures that should be tolerated by the implementation of the clusterstore. For example, an FTT of two indicates that two host failures are tolerated such that the entire clusterstore is still available even if as many as two hosts fail. If a number of host failures exceeds the FTT of the clusterstore, then the clusterstore may be unavailable until one or more hosts are restored. For example, if a clusterstore has an FTT of two, and three hosts fail, then the clusterstore will be unavailable while the failures persist. Thus, it is important to maintain fault tolerance when hosts are placed in maintenance mode, as described herein, to ensure continued data availability despite the potentially lengthy outages caused by maintenance mode. For instance, with conventional techniques, a host being placed in maintenance mode would always count as a strike against the FTT, as if the host being placed in maintenance mode were a failure. Thus, for example, with conventional techniques, if a host is placed in maintenance mode and the clusterstore has an FTT of one, the clusterstore would not be able to tolerate an actual failure without losing data availability. Accordingly, techniques described herein improve upon conventional techniques by transferring clusterstore data from a host that is to be placed in maintenance mode to another available host in the cluster (when possible), thereby maintaining the same level of fault tolerance even while the host is maintenance mode.

Figure 8:
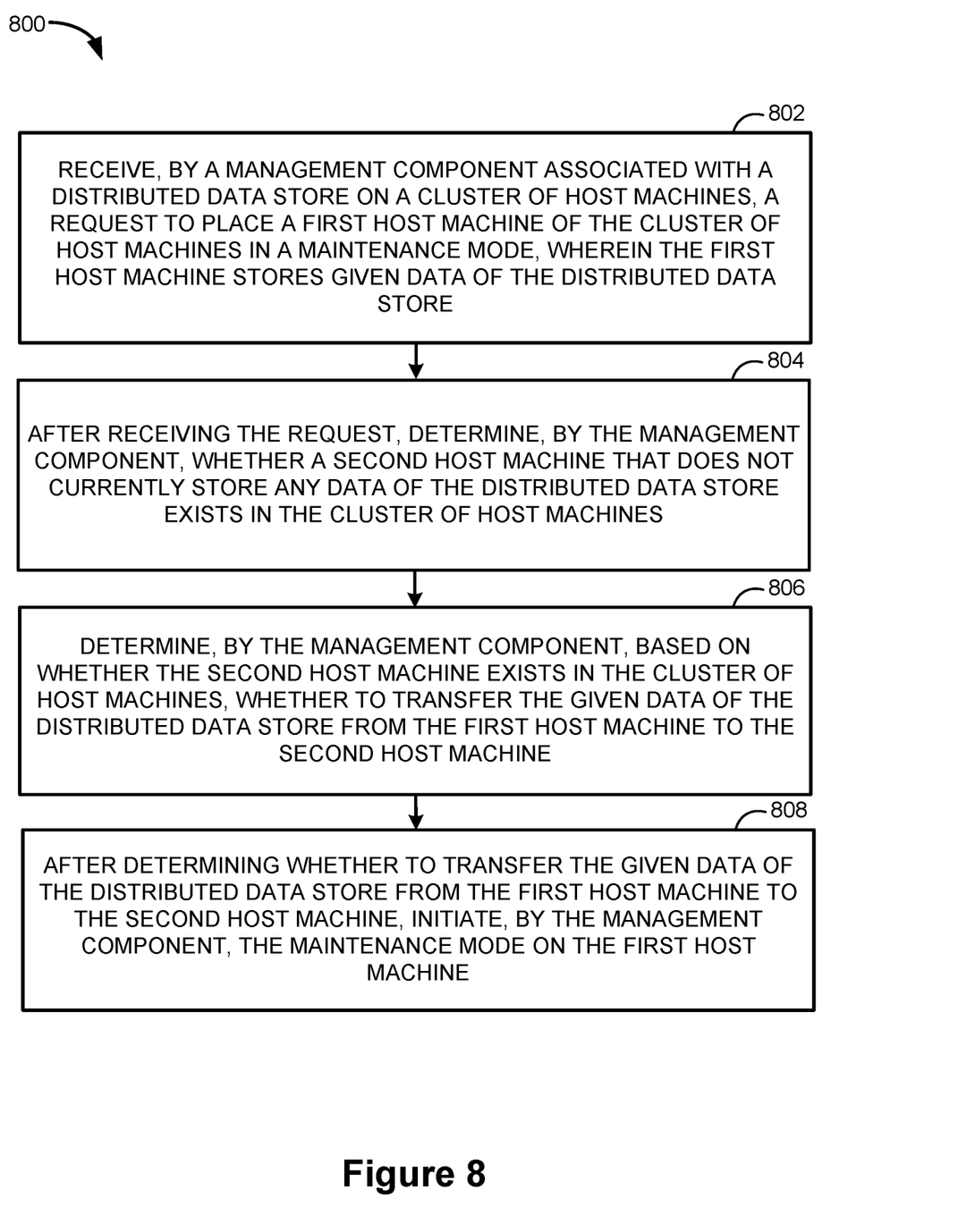
FIG. 8 illustrates example operations related to maintaining fault tolerance in a storage cluster.

FIG. 8 is a flowchart illustrating example operations 800 for maintaining fault tolerance in a storage cluster, according to an example embodiment of the present application. Operations 800 may be performed, for example, by one or more components of management component 140 of FIG. 1, as described above with reference to FIGS. 2-7.

Operations 800 begin at step 802, with receiving, by a management component associated with a distributed data store on a cluster of host machines, a request to place a first host machine of the cluster of host machines in a maintenance mode, wherein the first host machine stores given data of the distributed data store. In some embodiments, the distributed data store comprises a clusterstore, and the given data of the distributed data store comprises a replica related to the clusterstore.

Operations 800 continue at step 804, with, after receiving the request, determining, by the management component, whether a second host machine that does not currently store any data of the distributed data store exists in the cluster of host machines.

Operations 800 continue at step 806, with determining, by the management component, based on whether the second host machine exists in the cluster of host machines, whether to transfer the given data of the distributed data store from the first host machine to the second host machine.

Operations 800 continue at step 804, with, after determining whether to transfer the given data of the distributed data store from the first host machine to the second host machine, initiating, by the management component, the maintenance mode on the first host machine.

In some embodiments, determining whether the second host machine exists in the cluster of host machines comprises determining that the second host machine exists in the cluster of host machines, and the given data of the distributed data store is transferred from the first host machine to the second host machine.

In other embodiments, determining whether the second host machine exists in the cluster of host machines comprises determining that the second host machine does not exist in the cluster of host machines, in which case the given data of the distributed data store is not transferred from the first host machine to the second host machine. In such embodiments, the operations may further comprise determining, by the management component, that a number of failures to tolerate (FTT) of the distributed data store is greater than one, and decrementing, by the management component, the number of FTT of the distributed data store by one.

In some cases, determining whether the second host machine exists in the cluster of host machines comprises determining that the second host machine does not exist in the cluster of host machines, in which case the given data of the distributed data store is not transferred from the first host machine to the second host machine. For example, the method may further comprise determining, by the management component, that a number of failures to tolerate (FTT) of the distributed data store is zero, and deactivating, by the management component, the distributed data store.

According to certain embodiments, determining whether the second host machine exists in the cluster of host machines comprises determining that the second host machine exists in the cluster of host machines. In such embodiments, the method may further comprise determining, by the management component, that a number of failures to tolerate (FTT) of the distributed data store is zero, and recreating, by the management component, a state associated with the given data of the distributed data store on the second host machine.

Some embodiments further comprise removing, by the management component, the given data from the first host machine before initiating the maintenance mode on the first host machine.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), NVMe storage, Persistent Memory storage, a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and datastores are somewhat arbitrary, and particular operations are illustrated in the context of specific illustrative configurations. Other allocations of functionality are envisioned and may fall within the scope of one or more embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s). In the claims, elements and/or steps do not imply any particular order of operation, unless explicitly stated in the claims.

We claim:

1. A method for maintaining fault tolerance in a storage cluster, comprising:

receiving, by a management component associated with a distributed data store on a cluster of host machines, a request to place a first host machine of the cluster of host machines in a maintenance mode, wherein the first host machine stores given data of the distributed data store;

after receiving the request, determining, by the management component, whether a second host machine that does not currently store any data of the distributed data store exists in the cluster of host machines;

determining, by the management component, based on whether the second host machine exists in the cluster of host machines, whether to transfer the given data of the distributed data store from the first host machine to the second host machine;

determining, by the management component, a number of failures to tolerate (FTT) of the distributed data store;

performing, based on the number of FTT of the distributed data store, at least one of:

decrementing, by the management component, the number of FTT of the distributed data store by one, deactivating, by the management component. the distributed data store: or recreating. by the management component. a state associated with the given data of the distributed data store on the second host machine; and after determining whether to transfer the given data of the distributed data store from the first host machine to the second host machine, initiating, by the management component, the maintenance mode on the first host machine.

2. The method of claim 1, wherein determining whether the second host machine exists in the cluster of host machines comprises determining that the second host machine exists in the cluster of host machines, and wherein the given data of the distributed data store is transferred from the first host machine to the second host machine.

3. The method of claim 1, wherein determining whether the second host machine exists in the cluster of host machines comprises determining that the second host machine does not exist in the cluster of host machines, wherein the given data of the distributed data store is not transferred from the first host machine to the second host machine, and wherein the method further comprises:

determining, by the management component, that the number of FTT of the distributed data store is greater than one; and decrementing, by the management component, the number of FTT of the distributed data store by one.

4. The method of claim 1, wherein determining whether the second host machine exists in the cluster of host machines comprises determining that the second host machine does not exist in the cluster of host machines, wherein the given data of the distributed data store is not transferred from the first host machine to the second host machine, and wherein the method further comprises:

determining, by the management component, that the number of FTT of the distributed data store is zero; and deactivating, by the management component, the distributed data store.

5. The method of claim 1, wherein determining whether the second host machine exists in the cluster of host machines comprises determining that the second host machine exists in the cluster of host machines, and wherein the method further comprises:

determining, by the management component, that the number of failures to tolerato FTT of the distributed data store is zero; and recreating, by the management component, a state associated with the given data of the distributed data store on the second host machine.

6. The method of claim 1, further comprising removing, by the management component, the given data from the first host machine before initiating the maintenance mode on the first host machine.

7. The method of claim 1, wherein the distributed data store comprises a clusterstore, and wherein the given data of the distributed data store comprises a replica related to the clusterstore.

8. A system for maintaining fault tolerance in a storage cluster, comprising:
- at least one memory; and
- at least one processor coupled to the at least one memory, the at least one processor and the at least one memory configured to:
  - receive, by a management component associated with a distributed data store on a cluster of host machines, a request to place a first host machine of the cluster of host machines in a maintenance mode, wherein the first host machine stores given data of the distributed data store;
  - after receiving the request, determine, by the management component, whether a second host machine that does not currently store any data of the distributed data store exists in the cluster of host machines;
  - determine, by the management component, based on whether the second host machine exists in the cluster of host machines, whether to transfer the given data of the distributed data store from the first host machine to the second host machine;
  - determine, by the management component, a number of failures to tolerate (FTT) of the distributed data store;
  - perform, based on the number of FTT of the distributed data store, at least one of:
    - decrement, by the management component, the number of FTT of the distributed data store by one,
    - deactivate, by the management component, the distributed data store; or
    - recreate, by the management component, a state associated with the given data of the distributed data store on the second host machine; and
  - after determining whether to transfer the given data of the distributed data store from the first host machine to the second host machine, initiate, by the management component, the maintenance mode on the first host machine.

9. The system of claim 8, wherein determining whether the second host machine exists in the cluster of host machines comprises determining that the second host machine exists in the cluster of host machines, and wherein the given data of the distributed data store is transferred from the first host machine to the second host machine.

10. The system of claim 8, wherein determining whether the second host machine exists in the cluster of host machines comprises determining that the second host machine does not exist in the cluster of host machines, wherein the given data of the distributed data store is not transferred from the first host machine to the second host machine, and wherein the at least one processor and the at least one memory are further configured to:
- determine, by the management component, that the number of FTT of the distributed data store is greater than one; and
- decrement, by the management component, the number of FTT of the distributed data store by one.

11. The system of claim 8, wherein determining whether the second host machine exists in the cluster of host machines comprises determining that the second host machine does not exist in the cluster of host machines, wherein the given data of the distributed data store is not transferred from the first host machine to the second host machine, and wherein the at least one processor and the at least one memory are further configured to:
- determine, by the management component, that the number of FTT of the distributed data store is zero; and
- deactivate, by the management component, the distributed data store.

12. The system of claim 8, wherein determining whether the second host machine exists in the cluster of host machines comprises determining that the second host machine exists in the cluster of host machines, and wherein the at least one processor and the at least one memory are further configured to:
- determine, by the management component, that the number of FTT of the distributed data store is zero; and
- recreate, by the management component, a state associated with the given data of the distributed data store on the second host machine.

13. The system of claim 8, wherein the at least one processor and the at least one memory are further configured to remove, by the management component, the given data from the first host machine before initiating the maintenance mode on the first host machine.

14. The system of claim 8, wherein the distributed data store comprises a clusterstore, and wherein the given data of the distributed data store comprises a replica related to the clusterstore.

15. A non-transitory computer-readable medium storing instructions that, when executed by one or more processors, cause the one or more processors to:
- receive, by a management component associated with a distributed data store on a cluster of host machines, a request to place a first host machine of the cluster of host machines in a maintenance mode, wherein the first host machine stores given data of the distributed data store;
- after receiving the request, determine, by the management component, whether a second host machine that does not currently store any data of the distributed data store exists in the cluster of host machines;
- determine, by the management component, based on whether the second host machine exists in the cluster of host machines, whether to transfer the given data of the distributed data store from the first host machine to the second host machine;
- determine, by the management component, a number of failures to tolerate (FTT) of the distributed data store;
- perform, based on the number of FTT of the distributed data store, at least one of:
  - decrement, by the management component, the number of FTT of the distributed data store by one,
  - deactivate, by the management component, the distributed data store; or
  - recreate, by the management component, a state associated with the given data of the distributed data store on the second host machine; and
- after determining whether to transfer the given data of the distributed data store from the first host machine to the second host machine, initiate, by the management component, the maintenance mode on the first host machine.

16. The non-transitory computer-readable medium of claim 15, wherein determining whether the second host machine exists in the cluster of host machines comprises determining that the second host machine exists in the cluster of host machines, and wherein the given data of the distributed data store is transferred from the first host machine to the second host machine.

17. The non-transitory computer-readable medium of claim 15, wherein determining whether the second host machine exists in the cluster of host machines comprises determining that the second host machine does not exist in the cluster of host machines, wherein the given data of the distributed data store is not transferred from the first host machine to the second host machine, and wherein the instructions, when executed by the one or more processors, further cause the one or more processors to:

determine, by the management component, the number of FTT of the distributed data store is greater than one; and     decrement, by the management component, the number of FTT of the distributed data store by one.

18. The non-transitory computer-readable medium of claim 15, wherein determining whether the second host machine exists in the cluster of host machines comprises determining that the second host machine does not exist in the cluster of host machines, wherein the given data of the distributed data store is not transferred from the first host machine to the second host machine, and wherein the instructions, when executed by the one or more processors, further cause the one or more processors to:

determine, by the management component, that the number of FTT of the distributed data store is zero; and     deactivate, by the management component, the distributed data store.

19. The non-transitory computer-readable medium of claim 15, wherein determining whether the second host machine exists in the cluster of host machines comprises determining that the second host machine exists in the cluster of host machines, and wherein the instructions, when executed by the one or more processors, further cause the one or more processors to:

determine, by the management component, the number of FTT of the distributed data store is zero; and     recreate, by the management component, a state associated with the given data of the distributed data store on the second host machine.

20. The non-transitory computer-readable medium of claim 15, wherein the instructions, when executed by the one or more processors, further cause the one or more processors to remove, by the management component, the given data from the first host machine before initiating the maintenance mode on the first host machine.

\* \* \* \* \*